United States Patent [19]

Okamoto et al.

[11] Patent Number: 5,278,278
[45] Date of Patent: Jan. 11, 1994

[54] AROMATIC POLYESTERS HAVING GOOD HEAT RESISTANCE

[75] Inventors: Masaru Okamoto, Tokai; Toshihide Inoue, Ichinomiya; Shiro Kataoka, Nagoya, all of Japan

[73] Assignee: Toray Industries, Inc., Japan

[21] Appl. No.: 20,000

[22] Filed: Feb. 17, 1993

Related U.S. Application Data

[63] Continuation of Ser. No. 758,260, Aug. 26, 1991, abandoned, which is a continuation of Ser. No. 595,683, Oct. 4, 1990, abandoned, which is a continuation of Ser. No. 183,746, filed as PCT/JP87/00536, Jul. 23, 1989, abandoned.

[30] Foreign Application Priority Data

Jul. 28, 1986 [JP] Japan ................... 61-175742
Aug. 6, 1986 [JP] Japan ................... 61-183374

[51] Int. Cl.$^5$ ............................. C08G 63/60
[52] U.S. Cl. .................... 528/190; 528/193; 528/206; 528/305
[58] Field of Search ............ 528/190, 193, 206, 305

[56] References Cited

U.S. PATENT DOCUMENTS

| | | | |
|---|---|---|---|
| 4,278,785 | 7/1981 | Rosenfeld | 528/305 |
| 4,446,302 | 5/1984 | Sandha et al. | 528/305 |
| 4,563,508 | 1/1986 | Cottis et al. | 525/444 |
| 4,618,699 | 10/1986 | Fialla | 528/305 |
| 4,728,715 | 3/1988 | Kock et al. | 528/190 |
| 4,778,927 | 10/1988 | Kock | 528/193 |
| 4,797,465 | 1/1989 | Portyugall et al. | 528/193 |
| 5,037,939 | 8/1991 | Eckhardt et al. | 528/193 |
| 5,066,767 | 11/1991 | Matzner et al. | 528/193 |
| 5,071,942 | 12/1991 | Brewbaker et al. | 528/193 |
| 5,086,158 | 2/1992 | Hayashi et al. | 528/193 |
| 5,089,594 | 2/1992 | Stern et al. | 528/193 |
| 5,097,001 | 3/1992 | Layton et al. | 528/193 |

FOREIGN PATENT DOCUMENTS

| | | | |
|---|---|---|---|
| 102094 | 9/1976 | Japan | 528/305 |
| 55398 | 5/1978 | Japan | 528/305 |
| 141317 | 11/1981 | Japan . | |
| 125278 | 8/1982 | Japan | 528/305 |
| 207923 | 11/1984 | Japan | 528/305 |
| 38425 | 2/1985 | Japan . | |
| 69138 | 4/1985 | Japan | 528/305 |
| 106832 | 6/1985 | Japan | 528/305 |
| 199028 | 10/1985 | Japan . | |
| 245632 | 12/1985 | Japan . | |
| 164719 | 7/1987 | Japan | 528/193 |

Primary Examiner—John Kight, III
Assistant Examiner—Rabon Sergent
Attorney, Agent, or Firm—Austin R. Miller

[57] ABSTRACT

The present invention relates to polyesters capable to give moldings having excellent flow characteristics, heat resistance and mechanical properties.

These polyesters are prepared by copolymerizing specified amounts of specific dioxycompounds such as t-butylhydroquinone, phenylhydroquinone and so on with polyesters comprising specified amounts of p-hydroxybenzoic acid, 4,4'-dihydroxybiphenyl, hydroquinone and terephthalic acid or terephthalic acid and isophthalic acid.

3 Claims, No Drawings

AROMATIC POLYESTERS HAVING GOOD HEAT RESISTANCE

This application is a continuation of application Ser. No. 07/758,260, filed Aug. 26, 1991, which is a continuation of application Ser. No. 07/595,683, filed Oct. 4, 1990, which is a continuation of application Ser. No. 07/183,746 filed as PCT/JP87/00536, Jul. 23, 1989, all abandoned.

TECHNOLOGICAL FIELD

The present invention relates to aromatic polyesters able to provide a molding having excellent flow characteristics, heat resistance and mechanical properties.

BACKGROUND TECHNOLOGY

Needs for high performance plastics have been recently raised more and more and many polymers having various new characteristics have been developed and are available in the market. Among them, optically anisotropic liquid crystalline polymers characterized by parallel arrangement of their molecular chains are given attention because they have excellent mechanical properties.

As one of these liquid crystalline polymers, thermotropic polyesters are well known and, for example, p-hydroxybenzoic acid homopolymer and its copolymer copolymerized with 4,4'-dihydroxybiphenyl and phthalic acid are well known. However, these homo- and co-polymers of p-hydroxybenzoic acid are inferior in melt-fluidity as their melting points are too high. Therefore, polyesters whose melting points are lowered by copolymerizing various components with p-hydroxybenzoic acid have been applied for to obtain patents. For example, a polyester prepared by copolymerizing phenylhydroquinone, terephthalic acid and/or 2,6-naphthalenedicarboxylic acid with p-hydroxybenzoic acid (Japanese Patent Publication No. 500,215/1980), a polyester prepared by copolymerizing 2,6-dihydroxynaphthalene and terephthalic acid with p-hydroxybenzoic acid (Japanese Patent Laid-Open No. 50594/1979), a polyester prepared by copolymerizing 2,7-dihydroxynaphthalene, isophthalic acid and/or terephthalic acid with p-hydroxybenzoic acid (Japanese Patent Laid-Open No. 38426/1985, No. 104,123/1985), a polyester prepared by copolymerizing hydroquinone, isophthalic acid and moreover a small amount of 4,4'-dihydroxybiphenyl and terephthalic acid with p-hydroxybenzoic acid (Japanese Patent Laid-Open No. 38425/1985, No. 235,833/1985), a polyester consisting of p-hydroxybenzoic acid, 4,4'-dihydroxybiphenyl or hydroquinone, terephthalic acid and isophthalic acid (Japanese Patent Publication No. 47870/1972), a polyester prepared by copolymerizing phenylhydroquinone, 4,4'-dihydroxybiphenyl and terephthalic acid with p-hydroxybenzoic acid of less than 57 mole % of the whole (Japanese Patent Laid-Open 199,028/1985) and a polyester prepared by copolymerizing p-oxybenzoic acid, an aromatic dihydroxy compound and terephthalic acid with polyethylene terephthalate (Japanese Patent Laid-Open No. 8395/1976) are disclosed.

Therefore, the present inventors carried out polymerization, molding and evaluation of various new polyesters to obtain polyesters capable of providing moldings having good flow characteristics, heat resistance and mechanical properties and found that aromatic polyesters consisting of specified amounts of p-hydroxybenzoic acid, 4,4'-dihydroxybiphenyl, hydroquinone and terephthalic acid or terephthalic acid and isophthalic acid as well as aromatic polyesters prepared by copolymerizing dihydroxy compounds such as t-butylhydroquinone and so on with these polyesters could satisfy the above described purpose.

DISCLOSURE OF THE INVENTION

The present invention offers aromatic polyesters having good heat resistance comprising the below described structural units (I) to (IV), where the proportion of the structural unit (I) is 60 to 90, mole % of the whole, the proportion of a combination of structural units represented by the addition of [(II)+(III)+(IV)] is 40 to 10 mole %, where the mole ratio of structural unit (II) to structural unit (III) is from 1.5 to 4 and the mole ratio of structural unit (III) to structural unit (IV) is no less than 1/19, the proportion of a combination of structural units represented by the ratio (II)/[(II)+(III)+(IV)] is 50 to 95 mole % and the proportion of a combination of structural units represented by the ratio (III)/[(III)+(IV)] is 5 to 100 mole % and whose logarithmic viscosity of 0.1 g/dl pentafluorophenol solution at 60° C. is 1.0 to 20.0 dl/g.

The described structural units are as follows:

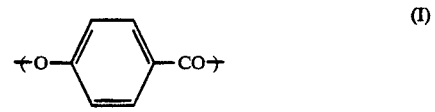

(I)

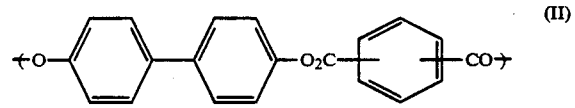

(II)

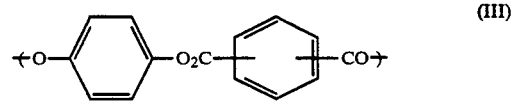

(III)

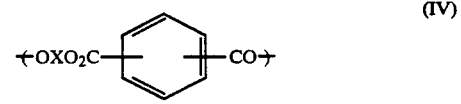

(IV)

(wherein X is selected from the group consisting of:

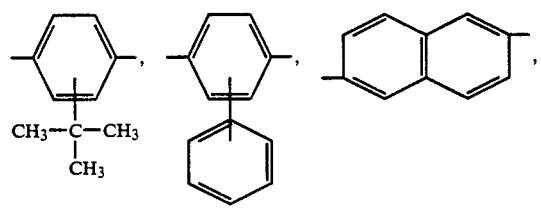

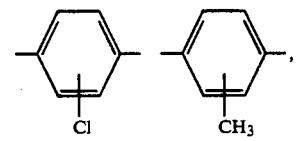

the carbonyl groups in the structural units (II) to (IV) have a relation of meta and para positions to each other and more than 65 mole % thereof are in the para position).

When the polyester is comprised of only the structural units (I) to (III) in the present invention, it is preferable that 65 to 85 mole % of the carbonyl groups in (II) and (III) are in para position.

It is generally expected that the heat resistance is ordinarily largely lowered by copolymerizing a dihydroxy compound having a bulky substituted group such as t-butylhydroquinone with a polyester consisting of the rigid structures (I) to (III), but the present inventors found that the decrease in heat resistance was very little and both the flow characteristics and the mechanical properties could be largely improved.

THE BEST EMBODIMENTS OF THE PRESENT INVENTION

The present invention will be explained below in detail.

In aromatic polyesters of the present invention, the above described structural unit (I) represents the structural unit of polyester prepared of p-hydroxybenzoic acid.

The above described structural unit (II) represents the structural unit of polyester prepared of 4,4'-dihydroxybiphenyl and terephthalic acid or terephthalic acid and isophthalic acid.

The above described structural unit (III) represents the structural unit of polyester prepared of hydroquinone and terephthalic acid or terephthalic acid and isophthalic acid.

The above described structural unit (IV) represents the structural unit of polyester prepared of more than one dioxy compound selected from t-butylhydroquinone, phenylhydroquinone, 2,6-dihydroxynaphthalene, chlorohydroquinone and methylhydroquinone and terephthalic acid or terephthalic acid and isophthalic acid.

The structural unit (I) is 60 to 90 mole % of the whole, preferably 65 to 80 mole %. If the structural unit (I) is more than 90 mole % of the whole or less than 60 mole %, it is not desirable as the flow characteristics and heat resistance become poor.

The proportion of a combination of structural units represented by the ratio (II)/[(II)+(III)+(IV)] is 50 to 95 mole % of the whole. If the value is less than 50 mole %, the heat resistance is poor and if the value is more than 95 mole %, the flow characteristics become poor. These are therefore not desirable.

The proportion of a combination of structural units represented by the ratio (III)/[(III)+(IV)] is 5 to 100 mole % of the whole. If the value is less than 5 mole %, it is not desirable as either the flow characteristics, the heat resistance or the mechanical properties are poor.

Moreover, in aromatic polyesters of the present invention, the carbonyl groups in the structural units (II) and (III) have a relation of para or meta positions to each other and more than 65 mole % thereof are in para position. If the value is less than 65 mole %, it is not desirable as the heat resistance is not sufficient.

Moreover, if the polyester is comprised of only the structural units (I) to (III), it is preferable that 65 to 80 mole % of the carbonyl groups of the structural units (II) and (III) are in para position, and more preferably 72 to 77.5 mole %. If the para position exceeds 80 mole %, it is not desirable as the flow characteristics become poor.

On the other hand, when the polyester is comprised of the structural units (I) to (IV), it is preferable that the proportion of a combination of structural units represented by the ratio (IV)/[(III)+(IV)] is 10 to 80 mole % and the mole ratio of structural unit (IV) to structural unit (III) is from 1/9 to 4, and t-butylhydroquinone, phenylhydroquinone and 2,6-dihydroxynaphthalene are preferable among the dihydroxy compounds constituting the structural unit (IV).

Aromatic polyesters of the present invention can be prepared by applying correspondingly to the conventional polycondensation methods of polyester and no special limitation exists in the method of preparation. For example, the following methods (1) to (4) can be listed as representative methods.

(1) The method comprising preparing the aromatic polyesters by deacetylation and polycondensation reaction using acylated compound of oxycarboxylic acid such as p-acetoxybenzoic acid, acylated compound of aromatic dihydroxy compound such as 4,4'-diacetoxybiphenyl and hydroquinone diacetate and terephthalic acid and isophthalic acid.

(2) The method comprising preparing the aromatic polyesters by deacetylation and polycondensation reaction using aromatic dihydroxy compound such as p-oxybenzoic acid, 4,4'-dihydroxybiphenyl and hydroquinone, and terephthalic acid, isophthalic acid and acetic anhydride.

(3) The method comprising preparing the aromatic polyesters by dephenolation and polycondensation reaction using phenyl ester of p-oxybenzoic acid, aromatic dihydroxy compound such as 4,4'-dioxybiphenyl and hydroquinone and diphenyl ester of aromatic dicarboxylic acid such as terephthalic acid.

(4) The method comprising preparing the aromatic polyesters by dephenolation and polycondensation reaction reacting p-oxybenzoic acid, terephthalic acid and isophthalic acid with a required amount of diphenyl carbonate to prepare their phenyl esters and thereafter adding an aromatic dihydroxy compound such as 4,4'-dihydroxybiphenyl and hydroquinone.

In the methods (1) to (4), when 2,6-dihydroxynaphthalene is used, it is desirable that 2,6-diacetoxynaphthalene is also used in the methods (2) to (4).

These polycondensation reactions proceed without any catalyst, but in some cases, it is preferable to add a metallic compound such as potassium acetate, sodium acetate, antimony trioxide, metallic magnesium, stannous acetate and tetrabutyl titanate.

Regarding the melt viscosity of the aromatic polyesters of the present invention, 50 to 15,000 poises are preferable and 100 to 10,000 poises are more preferable.

The values of this melt viscosity are measured by means of Kota type flow tester at the temperature of liquid crystal starting temperature plus 30° to 50° C. under the shear rate of 1,000 to 3,000 sec$^{-1}$.

The logarithmic viscosity of these aromatic polyesters dissolved in a concentration of 0.1 weight % in pentafluorophenol at 60° C. is 1.0 to 20.0 dl/g, and 2.0 to 10.0 dl/g is especially preferable.

When polycondensation of aromatic polyesters of the present invention is carried out, besides the components composing the above described (I) to (IV), aromatic dicarboxylic acids such as 4,4'-diphenyldicarboxylic acid, 2,2'-diphenyldicarboxylic acid, 1,2-bis(phenoxy)ethane-4,4'-dicarboxylic acid, 1,2-bis(2-chlorophenoxy)ethane-4,4'-dicarboxylic acid and 2,6-dicarboxynaphthalene, cycloaliphatic dicarboxylic acids such as hexahydroterephthalic acid, aromatic dihydroxy compounds such as bisphenol A, bisphenol S, resorcine, 4,4'-dihydroxydiphenyl sulfide and 2,7-dihydroxynaphthalene, aromatic oxycarboxylic acids such as m- oxybenzoic acid and 2,6-oxynaphthaoic acid, and p-aminophenol, p-aminobenzoic acid can be copolymerized in such a small amount that the purpose of the present invention is not defeated.

Aromatic polyesters of the present invention thus prepared have melting points lower than 400° C. and conventional melt moldings such as extrusion molding, injection molding, compression molding, blow molding and so on can be therefore applied to prepare fibers, films, three dimensional moldings, containers and hoses and so on.

Moreover, when molding is carried out, required characteristics can be given to aromatic polyesters of the present invention by adding reinforcing materials such as glass fibers, carbon fibers, asbestos, additives such as fillers, nucleation agents, pigments, anti-oxidative agents, stabilizers, plasticizers, lubricants, releasing agents and flame retardants and other thermoplastic resins.

Moreover, the strength of the moldings obtained can be improved by heat-treatment and their modulus can be improved as well in most cases.

This heat-treatment can be carried out by heat-treating the moldings in either an inert atmosphere (for example, nitrogen, argon, helium or steam), oxygen-containing atmosphere (for example, air) or under reduced pressure at the temperature below melting point of the polymer. This heat-treatment can be done either under stretched state or unstretched state for scores of minutes to several days.

The moldings prepared of new aromatic polyesters of the present invention have good optical anisotropy and flow characteristics due to the parallel molecular arrangement and excellent mechanical properties and heat resistance as well.

Example 1

54.05 g (30×10$^{-2}$ mole) of p-acetoxybenzoic acid (I), 18.38 g (6.8×10$^{-2}$ mole) of 4,4'-diacetoxybiphenyl (II), 6.21 g (3.2×10$^{-2}$ mole) of hydroquinone diacetate (III), 12.43 g (7.5×10$^{-2}$ mole) of terephthalic acid (IV) and 4.19 g (2.5×10$^{-2}$ mole) of isophthalic acid (V) were put in a polymerization test tube in such proportions that ratios (I)/[(I)+(II)+(III)], (II)/[(II)+(III)] and (IV)/[(IV)+(V)] of combinations of structural units were 75, 68 and 75 mole % respectively and deacetylation polymerization was carried out under the following conditions. At first, the reaction was carried out under nitrogen atmosphere at 250° to 360° C. for 3 hours and the pressure was thereafter reduced to 1 mmHg. Polycondensation reaction was completed by heating for more than one hour to have about a theoretical amount of acetic acid distillate and to obtain a brown polymer. Five batches of the polymerization were carried out under the same conditions and the polymers recovered were grinded by using a grinding machine manufactured by Horai Co., Ltd.

The theoretical structural formula of this polymer was as follows.

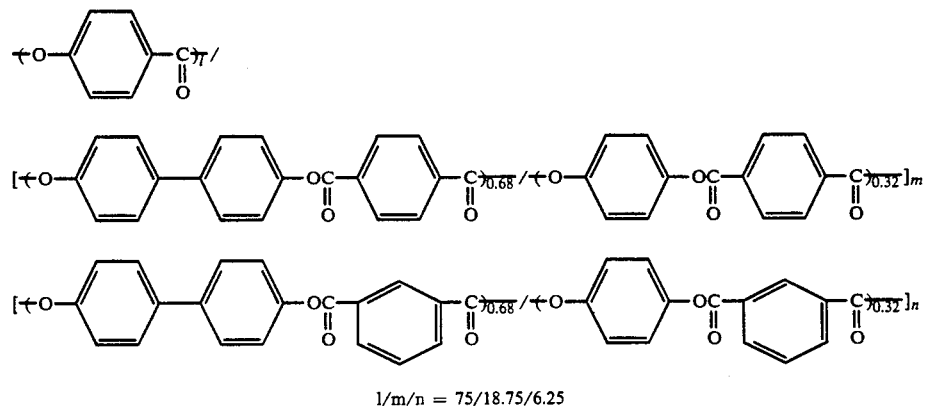

l/m/n = 75/18.75/6.25

The result of the elemental analysis of this polyester was shown in Table 1, which showed good coincidence with the theoretical values.

TABLE 1

|   | Measured values (weight %) | Theoretical values (weight %) |
|---|---|---|
| C | 71.4 | 71.6 |
| H | 3.4  | 3.5  |
| O | 25.2 | 24.9 |

Notice: The oxygen content (%) was calculated by the equation (100% − C % − H %).

This polyester was placed on the sample plate of a polarization microscope and the optical anisotropy was observed by elevating temperature. Good optical anisotropy was thereby observed above 305° C. The melt viscosity of this polymer was 6,500 poises at 350° C. under the rate of shear of 1,000 sec$^{-1}$, which was a very good flow characteristic.

Test pieces of $\frac{1}{8}"$ in thickness×$\frac{1}{2}"$ in width×5" in length and test pieces for the mold-notch impact strength of $\frac{1}{8}"$ in thickness×2$\frac{1}{2}"$ in length of this polymer were prepared by using Sumitomo-Nestal injection molding machine Promat 40/25 (manufactured by Sumitomo Heavy Machine Industries Co., Ltd.) under such conditions that the cylinder temperature and the mold temperature were 350° and 30° C. respectively. The flexural modulus of this test piece measured by using Tensilon UTM-100 manufactured by Toyo Boldwin Co. Ltd. under such conditions that the rate of strain was 1 mm/minute and the distance between spans was 50 mm, was 13.3 GPa. The value of Izod impact strength (mold-notch) was 34 kg.cm/cm, which meant high. Heat distortion temperature of the test piece of $\frac{1}{8}"$ in thickness was measured by using the heat distortion measuring apparatus manufactured by Toyo Seiki Co., Ltd. was 264° C. (18.56 kg/cm$^2$), which meant excellent heat resistance.

When these test pieces were heat-treated in a hot air oven at 190° to 270° C. for 22 hours, the flexural modulus of ⅛" in thickness increased to 14.5 GPa and the heat distortion temperature also greatly increased to higher than 290° C. (18.56 kg/cm²).

Examples 2 to 6, Comparison examples 1 to 7 p-Acetoxybenzoic acid (I), 4,4'-diacetoxybiphenyl (II), hydroquinone diacetate (III), terephthalic acid (IV) and isophthalic acid (V) were put into polymerization test tubes and the polycondensation reactions were carried out under the same reaction conditions as those of example 1 to obtain polymers. Homogeneous melt polymerization was possible in examples 2 to 6, but in the case of comparison examples 1 and 7, the polymers adhered to the stirrer and were partly solidified during polymerization and it made the homogeneous melt polymerization impossible.

Molding of these polymers was carried out under the same conditions as those of example 1 and the measurements of mechanical and thermal properties were done. These results are also shown in Table 2. The compositions of the present invention showed good flow characteristics, high toughness, high heat resistance and high elastic modulus.

spectively, and deacetylation polymerization was carried out under the following conditions.

At first, the reaction was carried out under nitrogen atmosphere at 250° to 340° C. for 3 hours and the pressure was thereafter reduced to 1 mmHg after the temperature was elevated at 350° C. Polycondensation reaction was furthermore carried out by heating for another one hour to obtain a brown polymer. Five batches of the polymerization were furthermore carried out under the same conditions and the polymers recovered were grinded by using a grinding machine manufactured by Horai Co., Ltd.

The theoretical structural formula of this polymer was as follows.

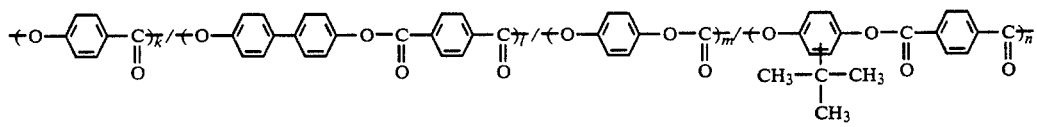

k/l/m/n = 72/17/2.5/8.5

The result of the elemental analysis of this polyester is shown in Table 3, which shows good coincidence with the theoretical values.

TABLE 3

|   | Measured values (weight %) | Theoretical values (weight %) |
|---|---|---|
| C | 73.1 | 72.3 |
| H | 3.5 | 3.8 |
| O | 23.4 | 23.9 |

Notice: The oxygen content (%) was calculated by the equation O (%) = (100% − C % − H %).

TABLE 2

| | Composition of raw materials | | | | | (I)/[(I) + (II) + (III)] (mole %) | (II)/[(II) + (III)] (mole %) | (IV)/[(IV) + (V)] (mole %) | Liquid crystal initiation temperature (°C.) | Melt[1] viscosity (poise) | Logarithmic viscosity (dl/g) | Flexural modulus (GPa) | Izod impact strength (kg · cm/cm) | Heat distortion temperature (°C.) |
|---|---|---|---|---|---|---|---|---|---|---|---|---|---|---|
| | (I) | (II) | (III) | (IV) | (V) | | | | | | | | | |
| Example | | | | | | | | | | | | | | |
| 2 | 30 | 6.0 | 4.0 | 7.5 | 2.5 | 75 | 60 | 75 | 311 | 5,300 | 3.0 | 13.5 | 29 | 264 |
| 3 | 30 | 8.0 | 2.0 | 7.5 | 2.5 | 75 | 80 | 75 | 311 | 8,600 | 3.4 | 11.9 | 36 | 258 |
| 4 | 28.8 | 6.0 | 5.2 | 7.5 | 2.5 | 72 | 54 | 75 | 306 | 4,800 | 2.9 | 13.7 | 25 | 249 |
| 5 | 28.8 | 7.2 | 4.0 | 7.5 | 2.5 | 72 | 64 | 75 | 305 | 6,400 | 3.2 | 13.1 | 28 | 254 |
| 6 | 28.8 | 8.0 | 3.2 | 7.5 | 2.5 | 72 | 71 | 75 | 306 | 5,100 | 3.0 | 12.0 | 30 | 255 |
| Comparison example | | | | | | | | | | | | | | |
| 1 | 30 | 3.2 | 6.8 | 7.5 | 2.5 | 75 | 32 | 75 | Solidification occurred during polymerization | | | | | |
| 2 | 30 | 4.0 | 6.0 | 7.5 | 2.5 | 75 | 40 | 75 | | | | | | |
| 3 | 30 | 4.0 | 6.0 | 10.0 | — | 75 | 40 | 100 | | | | | | |
| 4 | 26.8 | 13.2 | — | 9.9 | 3.3 | 67 | 100 | 75 | | | | | | |
| 5 | 26.8 | 13.2 | — | 13.2 | — | 67 | 100 | 100 | | | | | | |
| 6 | 24.0 | — | 16.0 | — | 16.0 | 60 | 0 | 0 | | | | | | |
| 7 | 24.0 | — | 16.0 | 16.0 | — | 60 | 0 | 100 | | | | | | |

[1]Measured at 350° C. under the shear rate of 1,000 sec$^{-1}$.

Example 7

51.89 g (28.8×10$^{-2}$ mole) of p-acetoxybenzoic acid (I), 18.38 g (6.8×10$^{-2}$ mole) of 4,4'-diacetoxybiphenyl (II), 1.94 g (1.0×10$^{-2}$ mole) of hydroquinone diacetate (III), 8.51 g (3.4×10$^{-2}$ mole) of t-butylhydroquinone diacetate (IV), and 18.61 g (11.2×10$^{-2}$ mole) of terephthalic acid were put in a polymerization test tube in such proportions that the ratio (I)/[(I)+(II)+(III)+(IV)], was 72 mole %, the ratio (II)/[(II)+(III)] was 87 mole % and the ratio (III)/[(III)+(IV)] was 23 mole % re- This polyester was placed on the sample plate of a polarization microscope and the optical anisotropy was observed by elevating temperature. Good optical anisotropy was thereby observed above 307° C.

Test pieces of this polyester were prepared by using the molding machine shown in example 1 under such conditions that the cylinder temperature and the mold temperature were 350° and 30° C. respectively. The flexural modulus of this test piece measured by the same conditions as those of example 1 was 16.2 GPa. The value of Izod impact strength (mold-notch) was 27 kg.cm/cm, which meant high. Heat distortion temperature measured was 252° C. (18.56 kg/cm²), which meant excellent heat resistance.

The melt viscosity of this polymer was 2,800 poises at 350° C. under the shear rate of 1,000 sec⁻¹, which was very good flow characteristics. The logarithmic viscosity of this polymer was 4.0 dl/g.

Example 8

51.89 g (28.8×10⁻² mole) of p-acetoxybenzoic acid (I), 21.62 g (8.00×10⁻² mole) of 4,4'-diacetoxybiphenyl (II), 3.11 g (1.60×10⁻² mole) of hydroquinone diacetate (III), 4.00 g (1.60×10⁻² mole) of t-butylhydroquinone diacetate (IV) and 13.95 g (8.40×10⁻² mole) of terephthalic acid (V), 4.65 g (2.80×10⁻² mole) of isophthalic acid (VI) were put in a polymerization test tube in such proportions that the ratio (I)/[(I)+(II)+(III)+(IV)] was 72 mole %, the ratio (II)/[(II)+(III)] was 83 mole %, the ratio (III)/[(III)+(IV)] was 50 mole % and the ratio (V)/[(V)+(VI)] was 75 mole % respectively, and deacetylation polymerization was carried out under the following conditions.

At first, the reaction was carried out under nitrogen atmosphere at 250° to 340° C. for 3 hours and the pressure was thereafter reduced to 1.5 mmHg after the temperature was elevated at 360° C. Polycondensation reaction was furthermore carried out by heating for another one hour to obtain a brown polymer. Five batches of the polymerization were furthermore carried out under the same conditions and the polymers recovered were grinded by using a grinding machine manufactured by Horai Co., Ltd.

The theoretical structural formula of this polymer was as follows.

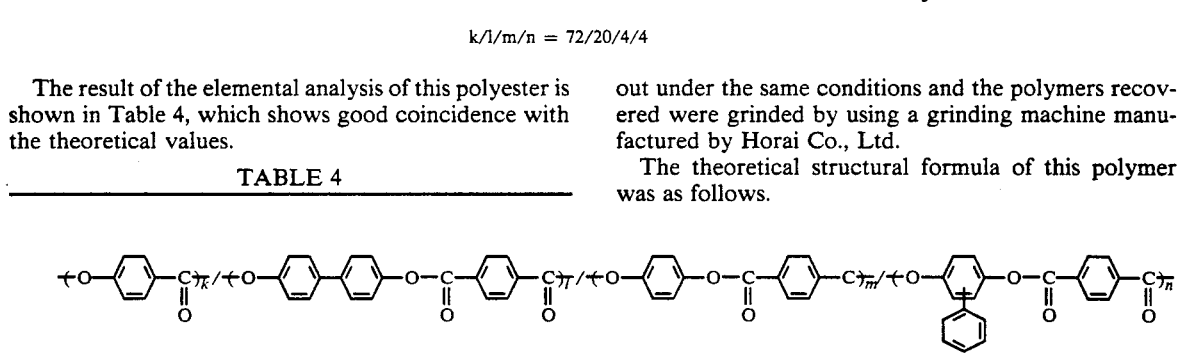

k/l/m/n = 72/20/4/4

The result of the elemental analysis of this polyester is shown in Table 4, which shows good coincidence with the theoretical values.

TABLE 4

|   | Measured values (weight %) | Theoretical values (weight %) |
|---|---|---|
| C | 70.9 | 70.6 |
| H | 3.3 | 3.4 |
| O | 25.8 | 26.0 |

Notice: The oxygen content (%) was calculated by the equation O (%) = 100 (%) − C (%) − H (%).

This polyester was placed on the sample plate of a polarization microscope and the optical anisotropy was observed by elevating the temperature and by adding a shear stress. Good optical anisotropy was thereby observed above 313° C.

Test pieces of this polyester were prepared by using the molding machine shown in example 1 under such conditions that the cylinder temperature and the mold temperature were 350° and 120° C. respectively. The bending modulus of this test piece was measured by the same conditions as those of example 1 was 16.8 GPa. The value of Izod impact strength (cut-notch) was 20 kg.cm/cm, which meant high strength. Heat distortion temperature measured was 265° C. (18.56 kg/cm²), which meant excellent heat resistance.

The melt viscosity of this polymer was 7,100 poises at 353° C. under the shear rate of 1,000 sec⁻¹, which was very good flow characteristics. The logarithmic viscosity of this polymer was 4.2 dl/g.

Example 9

51.89 g (28.8×10⁻² mole) of p-acetoxybenzoic acid (I), 18.38 g (6.8×10⁻² mole) of 4,4'-diacetoxybiphenyl (II), 1.94 g (1.0×10⁻² mole) of hydroquinone diacetate (III), 9.21 g (3.4×10⁻² mole) of phenylhydroquinone diacetate (IV) and 18.61 g (11.2×10⁻² mole) of terephthalic acid were put in a polymerization test tube in such proportions that the ratio (I)/[(I)+(II)+(III)+(IV)] was 72 mole %, the ratio (II)/[(II)+(III)] was 87 mole %, the ratio (III)/[(III)+(IV)] was 23 mole % respectively, and deacetylation polymerization was carried out under the following conditions.

At first, the reaction was carried out under nitrogen atmosphere at 250° to 350° C. for 3 hours and the pressure was thereafter reduced to 0.5 mmHg. Polycondensation reaction was furthermore carried out by heating for another 0.3 hour to obtain a brown polymer. Five batches of the polymerization were furthermore carried out under the same conditions and the polymers recovered were grinded by using a grinding machine manufactured by Horai Co., Ltd.

The theoretical structural formula of this polymer was as follows.

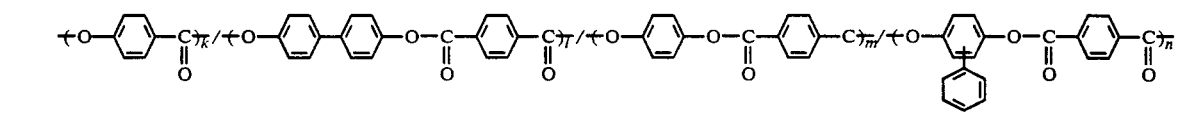

k/l/m/n = 72/17/2.5/8.5

Liquid crystal starting temperature of this polymer was 301° C. Test pieces were prepared by using the molding machine shown in example 1 under such conditions that the cylinder temperature and the mold temperature were 350° and 30° C. respectively. The bending modulus measured by the same conditions as those of example 1 was 11.7 GPa and the value of Izod impact strength (mold-notch) was 17 kg.cm/cm, which meant high. The heat distortion temperature measured was 208° C. (18.56 kg/cm²), which meant excellent heat resistance. The melt viscosity of this polymer was 650 poises at 350° C. under the shear rate of 1,000 sec$^{-1}$, which was good flow characteristics. The logarithmic viscosity of this polymer was 2.9 dl/g.

Example 10

54.05 g ($30 \times 10^{-2}$ mole) of p-acetoxybenzoic acid (I), 10.81 g ($4 \times 10^{-2}$ mole) 4,4'-diacetoxybiphenyl (II), 3.88 g ($2 \times 10^{-2}$ mole) of hydroquinone diacetate (III), 9.77 g ($4 \times 10^{-2}$ mole) of 2,6-diacetoxynaphtalene (IV), and 16.61 g ($10 \times 10^{-2}$ mole) of terephthalic acid were put in a polymerization test tube in such proportions that the ratio (I)/[(I)+(II)+(III)+(IV)] was 75 mole %, the ratio (II)/[(II)+(III)] was 67 mole %, and the ratio (III)/[(III)+(IV)] was 33 mole % respectively, and deacetylation polymerization was carried out under the following conditions.

At first, the reaction was carried out under nitrogen atmosphere at 250° to 340° C. for 3 hours and the pressure was thereafter reduced to 1.5 mmHg. Polycondensation reaction was furthermore carried out by heating for another 1.0 hour to obtain a brown polymer. Five batches of the polymerization were furthermore carried out under the same conditions and the polymers recovered were grinded by using a grinding machine manufactured by Horai Co., Ltd.

The theoretical structural formula of this polymer was as follows.

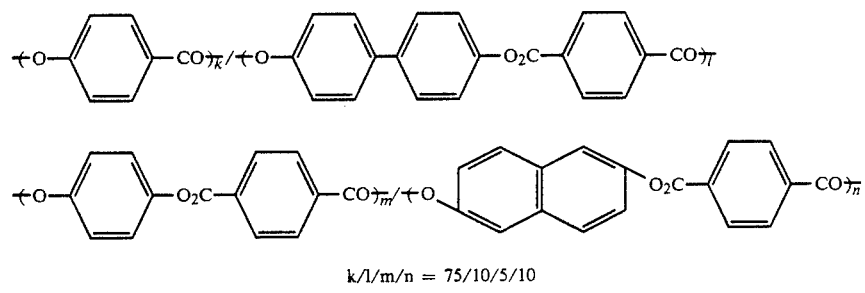

k/l/m/n = 75/10/5/10

The result of the elemental analysis of this polyester is shown in Table 5, which shows good coincidence with the theoretical values.

TABLE 5

|   | Measured values (weight %) | Theoretical values (weight %) |
|---|---|---|
| C | 71.9 | 72.0 |
| H | 3.5 | 3.5 |
| O | 24.6 | 24.5 |

Notice: The oxygen content (%) was calculated by the equation O (%) = 100 (%) − C (%) − H (%).

This polyester showed good optical anisotropy above 268° C.

The logarithmic viscosity of this polyester measured in pentafluorophenol (the polymer concentration was 0.1 g/dl) at 60° C. was 3.1 dl/g.

Test pieces of this polymer were prepared by using the molding machine shown in example 1 under such conditions that the cylinder temperature and the mold temperature were 320° and 120° C. respectively. The bending modulus measured by the same conditions as those of example 1 was 13 GPa and the value of Izot impact strength (mold-notch) was 15 kg.cm/cm, which was high. The heat distortion temperature measured was 241° C. (18.56 kg/cm²), which meant excellent heat resistance.

The melt viscosity of this polymer measured by using Kota type flow tester manufactured by Shimazu Corporation at 320° C. under the shear rate of 1,000 sec$^{-1}$ was 1,800 poises, which showed good flow characteristics. By using the spun filament obtained by this measurement, the dynamic loss peak temperature was measured by means of Rheovibron DDV-II-EA manufactured by Toyo Boldwin Co., Ltd. under such conditions that the frequency, the rate of temperature rise and the distance between chucks were 110 Hz, 2° C./minute and 40 mm respectively and the glass transition temperature was thereof obtained to be 234° C., which showed that the polymer had high heat resistance.

Examples 11 to 17 and comparison examples 8 to 13 p-Hydroxybenzoic acid (I), 4,4'-dihydroxybiphenyl (II), hydroquinone (III), t-butylhydroquinone (IV), phenylhydroquinone (V), chlorohydroquinone (VI), methylhydroquinone (VII) and terephthalic acid (VIII) were put in compositions of [(II)+(III)+(IV)+(V)+(VI)+(VII)]=(VIII) and shown in Table 6 and acetic anhydride of 1.2 times of (VIII) were also put in the mixture. The reaction was carried out under nitrogen atmosphere at 130° to 250° C. for 5 hours and furthermore at 250° to 340° C. for 2 hours. After elevating the temperature to 350° C., the pressure was reduced to 0.2 to 0.8 mmHg and the reaction was furthermore carried out for another 0.5 to 1 hour to obtain a brown polymer. Liquid crystal starting temperature, melt viscosity (measured at liquid crystal initiation temperature +40° C. under the rate of shear of 1,000 sec$^{-1}$) and logarithmic viscosity were measured.

Test pieces of this polymer were prepared by using the molding machine shown in example 1 under such conditions that the cylinder temperature was liquid crystal initiation temperature +40° C. and the molding temperature was 30° C. and bending modulus and heat distortion temperature were measured under the same conditions as those of example 1. These results are shown in Table 6.

TABLE 6

|   | Composition of raw materials ($\times 10^{-2}$ mole) | | | | | | | | (I)/[(I) + (II) + (III)] (mole %) | (II)/[(II) + (III)] (mole %) |
|---|---|---|---|---|---|---|---|---|---|---|
|   | (I) | (II) | (III) | (IV) | (V) | (IV) | (VII) | (VIII) | | |
| Example |   |   |   |   |   |   |   |   |   |   |

TABLE 6-continued

| | | | | | | | | | |
|---|---|---|---|---|---|---|---|---|---|
| 11 | 28.8 | 5.5 | 2.0 | 3.7 | — | — | — | 11.2 | 72 | 73 |
| 12 | 28.8 | 6.1 | 2.0 | 3.1 | — | — | — | 11.2 | 72 | 75 |
| 13 | 28.8 | 6.1 | 3.1 | 2.0 | — | — | — | 11.2 | 72 | 66 |
| 14 | 28.8 | 6.8 | 3.4 | 1.0 | — | — | — | 11.2 | 72 | 67 |
| 15 | 28.8 | 7.2 | 2.0 | — | 2.0 | — | — | 11.2 | 72 | 78 |
| 16 | 28.8 | 7.2 | 2.0 | — | — | 2.0 | — | 11.2 | 72 | 78 |
| 17 | 28.8 | 7.2 | 2.0 | — | — | — | 2.0 | 11.2 | 72 | 78 |
| Comparison example | | | | | | | | | | |
| 8 | 26.8 | 8.8 | — | 4.4 | — | — | — | 13.2 | 67 | 100 |
| 9 | 26.8 | 4.4 | — | 8.8 | — | — | — | 13.2 | 67 | 100 |
| 10 | 26.8 | — | 4.4 | 8.8 | — | — | — | 13.2 | 67 | 0 |
| 11 | 26.8 | — | 8.8 | 4.4 | — | — | — | 13.2 | 67 | 0 |
| 12 | 16.0 | 8.0 | — | — | 16.0 | — | — | 24.0 | 40 | 100 |
| 13 | 26.8 | 4.4 | — | — | 8.8 | — | — | 13.2 | 67 | 100 |

| | (III)/[(III) + (IV) + (V) + (IV) + (VII)] (mole %) | Liquid crystal initiation temperature (°C.) | Melt viscosity (poise) | Logarithmic viscosity (dl/g) | Flexural modulus (GPa) | Heat distortion temperature (°C.) |
|---|---|---|---|---|---|---|
| Example | | | | | | |
| 11 | 35 | 298 | 2,000 | 3.8 | 15.2 | 235 |
| 12 | 39 | 306 | 5,700 | 4.5 | 15.4 | 244 |
| 13 | 61 | 310 | 5,900 | 4.4 | 14.1 | 270 |
| 14 | 77 | 317 | 4,500 | 4.3 | 14.0 | 282 |
| 15 | 50 | 305 | 630 | 3.0 | 14.1 | 262 |
| 16 | 50 | 301 | 760 | 3.1 | 15.4 | 247 |
| 17 | 50 | 300 | 750 | 2.9 | 15.3 | 243 |
| Comparative example | | | | | | |
| 8 | 0 | 302 | 8,200 | 4.3 | 13.4 | 215 |
| 9 | 0 | 266 | 750 | 3.1 | 11.4 | 165 |
| 10 | 33 | Solidification occurred during polymerization | | | | |
| 11 | 67 | | | | | |
| 12 | 0 | 294 | 2,700 | 3.8 | 9.4 | 151 |
| 13 | 0 | 312 | 3,700 | 3.9 | 9.2 | 168 |

It can be seen from Table 6 that polyesters of the present invention had good flow characteristics and excellent mechanical properties and heat resistance. On the contrary, it can be also seen from Table 6 that polyesters of comparison examples had inferior flow characteristics and heat resistance to those of polyesters of the present invention (Comparison example 8), had poor heat resistance (Comparison examples 9, 12 and 13), or were solidified during polymerization and homogeneous melt polymerization was impossible (Comparison examples 10 and 11).

Possibility of Industrial Applications

Aromatic polyesters thus obtained have melting points below 400° C. in many cases and can be melt-moldable by means of ordinary melt moldings such as extrusion molding, injection molding, compression molding, blow molding and the like to prepare fibers, films, three dimensional moldings, containers and hoses. They can be used for electronic parts such as connectors and the like, optical fiber parts such as tension members and the like, chemical apparatus such as packings for packed columns and the like, automotive parts, containers for electronic ranges, IC sealing materials, plastic magnets and so on.

We claim:

1. Moldings having good heat resistance prepared by either extrusion or injection molding of the combined aromatic polyesters comprising the below described structural units (I), (II), (III) and (IV):

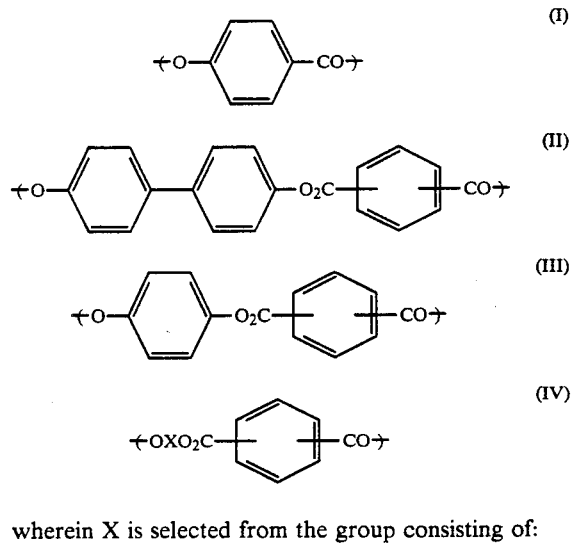

wherein X is selected from the group consisting of:

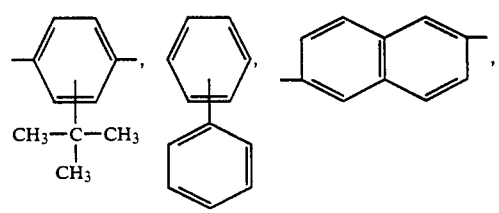

-continued

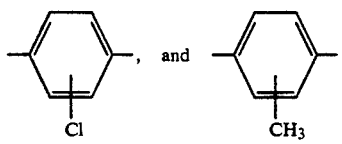

and the carbonyl groups in the structural units (II) and (IV) are in the meta and para positions in relation to each other and more than 65 mole % thereof are in the para position;

where the structural unit (I) comprises 60 to 90 mole % of the whole polyester, structural units [(II)+(III)+(IV)] comprise 40 to 10 mole % of the whole, where the mole ratio of structural unit (II) to structural unit (III) is from 1.5 to 4, and the mole ratio of structural unit (III) to structural unit (IV) is no less than 1/19; the structural units are polymerized via polycondensation reaction; the logarithmic viscosity of the said combined aromatic polyesters in a 0.1 g/dl pentafluorphenol solution at 60° C. is 2.0 to 10 dl/g; and the heat distortion temperature of said combined aromatic polyesters is at least 208° C. (18.56 Kg/cm).

2. Moldings as described in claim 1, wherein structural unit (I) comprises 65 to 80 mole % of the whole, structural units [(II)+(III)+(IV)] comprise 35 to 20 mole % of the whole, the mole ratio of structural unit (IV) to structural unit (III) is from 1/9 to 4, and X in the structural unit (IV) is selected from the group consisting of:

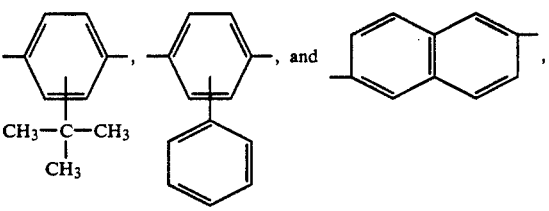

and 100 mole % of the carbonyl groups of the structural units (II) to (IV) are in the para position.

3. Moldings as described in claim 1, wherein 72 to 77.5 mole % of the carbonyl groups of the structural units (II) and (III) are in the para position.

* * * * *

UNITED STATES PATENT AND TRADEMARK OFFICE
CERTIFICATE OF CORRECTION

PATENT NO. : 5,278,278
DATED : January 11, 1994
INVENTOR(S) : Masaru Okamoto et al It is certified that error appears in the above-indentified patent and that said Letters Patent is hereby corrected as shown below:

Column 16, line 2, please change "Kg/cm" to --$Kg/cm^2$--.

Signed and Sealed this

Fourteenth Day of June, 1994

Attest:

BRUCE LEHMAN

*Attesting Officer*      *Commissioner of Patents and Trademarks*

UNITED STATES PATENT AND TRADEMARK OFFICE
CERTIFICATE OF CORRECTION

PATENT NO. : 5,278,278
DATED : January 11, 1994
INVENTOR(S) : Masaru Okamoto et al It is certified that error appears in the above-identified patent and that said Letters Patent is hereby corrected as shown below:

In Column 15, line 9, please change "and", second occurrence, to --to--.

Signed and Sealed this

Eighteenth Day of July, 1995

Attest:

BRUCE LEHMAN

Attesting Officer    Commissioner of Patents and Trademarks